United States Patent

Lindsay

[15] 3,639,816
[45] Feb. 1, 1972

[54] VACUUM CAPACITOR WITH SOLID DIELECTRIC

[72] Inventor: Wesley N. Lindsay, San Jose, Calif.

[73] Assignee: International Telephone and Telegraph Corporation, New York, N.Y.

[22] Filed: Aug. 10, 1970

[21] Appl. No.: 62,324

[52] U.S. Cl. ...................... 317/245, 317/249 R, 317/249 T
[51] Int. Cl. ................................................. H01g 5/04
[58] Field of Search .................. 317/245, 244, 249 R, 249 T

[56] References Cited

UNITED STATES PATENTS

| | | | |
|---|---|---|---|
| 1,871,048 | 8/1932 | Dublier | 317/249 R |
| 3,155,887 | 11/1964 | Barnes | 317/249 T |
| 3,239,730 | 3/1966 | Parbo | 317/249 T |
| 3,482,153 | 12/1969 | Caprio | 317/249 R |

FOREIGN PATENTS OR APPLICATIONS

| | | | |
|---|---|---|---|
| 1,128,046 | 4/1962 | Germany | 317/249 T |

OTHER PUBLICATIONS

Dummer Variable Capacitors and Trimmers Pitman & Sons London 1963 pp. 84- 85

Primary Examiner—E. A. Goldberg
Attorney—C. Cornell Remsen, Jr., Walter J. Baum, Paul W. Hemminger, Charles L. Johnson, Jr. and Thomas E. Kristofferson

[57] ABSTRACT

A unique combination of vacuum component techniques to a solid dielectric capacitor. The vacuum-type enclosure includes at least one generally cylindrical body shell member of insulating material and one or more metallic cylindrical sections attached thereto. A control shaft operating through a vacuum-type bellows moves an internal cylindrical member encased in an insulating material sleeve of polytetrafluoroethylene to provide variable capacitive engagement within at least one of the outer metallic shell members. The bearing arrangements common in vacuum variable capacitors are eliminated, because the fluorocarbon insulating dielectric material preserves the spacing and coaxial relationship of the inner and outer shells and provides a sliding surface of very low friction. Advantage is taken of the desirable dielectric strength of the fluorocarbon dielectric material without the destructive effects of corona in air. An alternative planar element embodiment of the invention using disc plates and a spring disc variable plate is also shown. In that embodiment the dielectric is also a planar element.

10 Claims, 5 Drawing Figures

PATENTED FEB 1 1972

3,639,816

INVENTOR.
WESLEY N LINDSAY
BY William T. O'Neil
AGENT

VACUUM CAPACITOR WITH SOLID DIELECTRIC

BACKGROUND OF THE INVENTION

1. Field of the Invention

This invention relates to variable vacuum capacitors.

2. Description of the Prior Art

Vacuum capacitors in a variety of configurations have long been extant in this art. The most common types involve movable and fixed sets of interleaving cylindrical plates in an evacuated envelope. The evacuated space, with its unity dielectric constant, predetermines the capacitance/size relationship for given voltage and power ratings in such devices. Moreover, rather expensive and carefully aligned bearings are required.

It is the foregoing disadvantages which generate the need for the present invention.

SUMMARY

It may be said that the general objective of the present invention was to provide a solid dielectric capacitor exhibiting substantially all of the well-known advantages of vacuum capacitors, and in addition, affording higher capacitance per unit volume than possible with prior art vacuum capacitors.

The unique advantages of the present invention are obtained through the use of a solid dielectric having a substantially higher dielectric constant than that of air or an evacuated space. The problem of selecting a suitable dielectric material for such capacitor as envisioned in the present invention, is not at all responsive to the well-known prior art capacitor dielectric criteria because of the multiple functions required of the dielectric layer. Although a great variety of dielectric materials exhibiting low losses in specific frequency ranges and relatively high dielectric constants have been employed in the past, comparatively few of such dielectric materials are adapted electrically and physically for inclusion in the present invention. The physical criteria for a suitable dielectric material for use in capacitors according to the present invention include low vapor pressure, high melting point and a lubricatory surface characteristic.

In capacitors constructed in accordance with the present invention, fluorocarbon polymers have been found to be very satisfactory. In particular, fluorocarbon polymers with low vapor pressure and high melting point are preferred. Such a material is polytetrafluorethylene, commercially known as "Teflon."

The outgassing process in the manufacture of vacuum components involves the application of heat as a processing step. Accordingly, the physical property requirements for the required dielectric material will be understood. The aforementioned polytetrafluoroethylene material has been found to exhibit the appropriate outgassing compatibility in that it has a low vapor pressure and high melting point. It also exhibits the desired lubricatory surface quality desired and is electrically satisfactory.

This description illustrates several embodiments in which the properties of the Teflon dielectric material are exploited in several ways. It is known that Teflon deteriorates rapidly in the presence of corona when it is applied as a high voltage dielectric in the atmosphere. Operation as a high voltage dielectric in an evacuated vessel eliminates this problem and makes it possible to exploit the other properties of the material.

In the several embodiments shown, it will be realized that the overall mechanical structure is substantially simplified as compared to the prior art because the movable plate, or plates, are actually supported by the Teflon dielectric as they are caused to slide over its lubricatory surface. Expensive bearing structures are thereby eliminated and a further contribution is made to the reduction in size and weight.

Capacitors constructed in accordance with the present invention are particularly adaptable for use as high voltage trimmers or neutralizing capacitors in such applications as; radio frequency amplifiers, oscillators, radio frequency power couplers and antenna matching units, to mention just a few possible applications.

DESCRIPTION OF THE PREFERRED EMBODIMENTS

For convenience in this description, the aforementioned polytetrafluoroethylene will be referred to as Teflon. A reference listing some properties of that material is the "Handbook of Chemistry and Physics" (49th Edition, published by Chemical Rubber Company of Cleveland, Ohio). In that handbook, under "Properties of Commercial Plastics," materials of the chemical class polytetrafluoroethylene are identified and some of their properties of interest are listed. The material is otherwise well known and has been widely used in electrical and nonelectrical applications.

Concerning the selection of appropriate materials for the other illustrated parts of devices in accordance with the invention, it is pointed out that in the vacuum component prior art, much is known about appropriate constructional materials. Also the prior art teaches methods of constructing and sealing vacuum type enclosures which include ceramic or glass insulator sections used with metallic enclosure members. It is also well understood that the process step in which the enclosure is evacuated requires an access opening, generally known in this art as a "tubulation," which is sealed after the evacuation process is completed. Equivalent measures are required in connection with the construction of the present invention however, they are omitted from the drawings submitted with this specification for clarity since they are not a novel part of the present invention.

Figure 1:
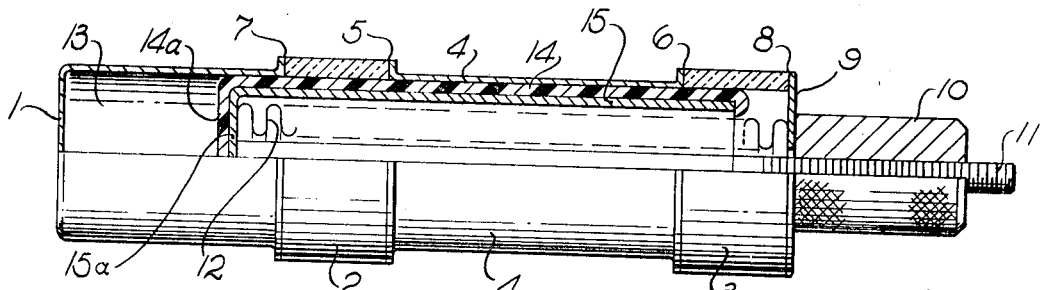
FIG. 1 is a sectional drawing of a tubular plate version of the present invention with two electrically separate fixed electrodes and a single movable electrode resembling a differential (split-stator) capacitor.

Referring now to FIG. 1, a differential split-stator arrangement is illustrated. The vacuum enclosure includes the two stator or fixed electrodes, 1 and 4, which are separated by an insulating tubular section 2 sealed to 1 and 4 at 7 and 5, respectively. Another insulator 3 is sealed to the metallic electrode 4 at 6 and to an endplate 9 at 8. An inside metallic tubular section 15 serves as the rotor, or movable, electrode. The closed end of the element 15 is illustrated at 15a, and it is within the inside of this closed end that a leadscrew 11, is attached. The endplate 9 has a center clearance hole through which the leadscrew 11 is allowed to project to the right of the figure, as indicated. The seals 5, 6, 7 and 8, are, of course, vacuum type seals. The same can be said of sealing of the bellows 12 to the inside of the movable electrode (within 15a) and the seal of the said bellows to the endplate 9. Accordingly, the evacuated space is that around the outside perimeter of the bellows 12 and includes the space substantially filled by the Teflon sleeve 14 which surrounds the movable electrode 15. The said sleeve 14 preferably includes a complete wraparound at 14a around the end 15a of the said movable electrode. Without this Teflon wraparound 14a, the movable structure obviously cannot be permitted to closely approach the inside end of the member 1.

For the sake of structural completeness, an adjustment knob 10 is illustrated. This knob would have internal threads to mate with the external threads of the leadscrew 11. In view of the evacuated space as described, including the volume at 13, it will be apparent that the external air pressure will act to tend to extend the bellows 12, that is, external air pressure will tend to mesh movable electrode 15 with the fixed electrode 1 to the maximum extent. Accordingly, the adjustment knob 10 is thereby mechanically biased against the endplate 9. This effect is helpful in eliminating "lost motion" in the thread engagement between 10 and 11. Obviously, counterclockwise rotation of 10 would cause movement of the screw 11 axially to the right or the left, depending upon the sense of the thread pitches. Counterclockwise rotation would, of course, produce the converse.

If the capacitor of FIG. 1 were mounted at the endplate 9, such that a "ground" existed there, the movable electrode 15 would thereby be grounded. If, however, a mounting was otherwise provided so that the plate 9 was floating electrically, it would obviously be possible to provide a separate electrical contact thereto and to construct the adjustment knob 10 of insulating material, possibly with a cap over the protruding end of the leadscrew 11.

The fixed electrodes 1 and 4 will be seen to provide their own external electrical access or contact surface. The axial lengths of the elements 1, 4 and 15 are arbitrarily illustrated in FIG. 1, and obviously these could be varied in proportion to produce any desired differential capacitance relationship among the said fixed and movable electrodes.

Figure 2:
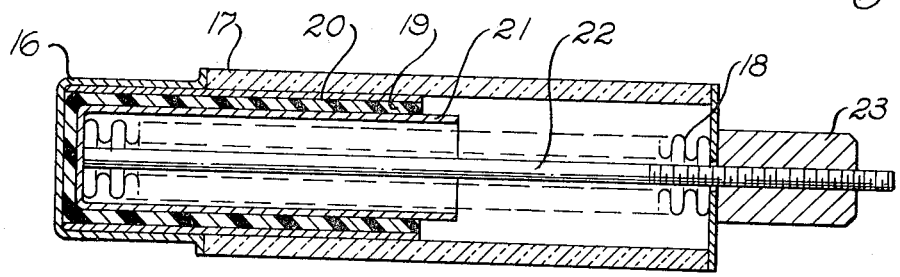
FIG. 2 is a sectional drawing of a high voltage, single fixed electrode embodiment of the present invention.

Referring now to FIG. 2, an embodiment of the present invention is illustrated in a "single ended" form. The ceramic tube 17 is relatively long in comparison with the total length of the device, an expedient which provides for high voltage operation of the capacitor.

Most of the description taken in connection with FIG. 1 is applicable to FIG. 2, the differences being substantially obvious from inspection of the figures, once the operation and structural details of FIG. 1 are understood.

A leadscrew 22 and adjustment knob 23 operate substantially identical to their counterparts 10 and 11, respectively, from FIG. 1. The bellows 18, moreover, is sealed and functions the same as counterpart metal bellows 12 from FIG. 1. The metal tube 20 is electrically an extension with the ceramic insulating tube 17 of the element 16, the latter being the externally connectable portion of the fixed electrode. The inside metal tube 21 forms the movable electrode and is separated by the Teflon sleeve 19 which also completely engulfs the end (left as illustrated) of 21.

Figure 3:
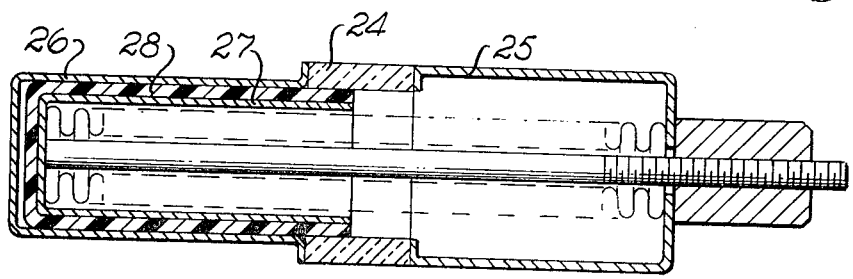
FIG. 3 is a modification of the embodiment of FIG. 2 for use where the degree of external flashover insulation required is lower.

Referring now to FIG. 3, a lower voltage version of the single ended capacitor of FIG. 2, is illustrated. Except for the longer fixed electrode 26, the shorter insulating ceramic tube 24 and the tubular end closure 25, in lieu of the endplate, such as 9 of FIG. 1, the structure of FIG. 3 does not differ substantially from that of FIG. 2. The movable electrode 27 is surrounded by essentially the same type of Teflon sleeve 28, as found at 19 in FIG. 2. In FIG. 2, electrical connection to the fixed electrode 26 is afforded directly at its outside surface, whereas the movable electrode 27 may be contacted along the metallic member 25 which is in contact with the movable electrode through the leadscrew and bellows. In view of the shorter relative length of the ceramic insulating tubular member 24, the embodiment of FIG. 3 may be expected to be applicable to lower voltage applications than that of FIG. 2.

Figure 4:
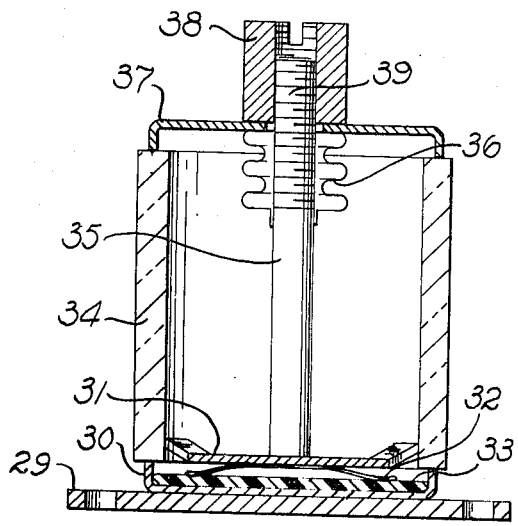
FIG. 4 is a planar element version of the present invention, also shown in section, employing a resilient deformable movable electrode.
Figure 5:
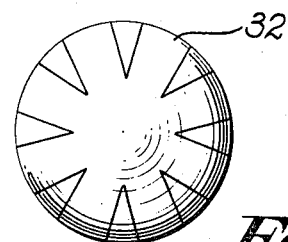

Referring now to FIGS. 4 and 5, an embodiment is illustrated in which the fixed electrode 30 is substantially planar or disclike, and is mounted on a metallic mounting plate 29. Such a device is adapted to high power radio frequency bypassing applications, or the like. Of course it is not necessary that the fixed electrode 30 be grounded to a mounting plate, an insulating mounting about the ceramic envelope 34 (for example) being easily substituted.

The familiar shaft or leadscrew 35 with threaded portion 39 and cooperating adjustment nut 38 will be recognized. Since the amount of shaft movement in a capacitor of this design is relatively small, the bellows 36 is correspondingly short and is sealed to the shaft 39 at a point within the evacuated chamber, as illustrated. The fixed electrode 30 is, of course, also sealed to the bottom perimeter of the ceramic envelope 34, and a corresponding Teflon dielectric layer in the form of a disc is shown at 33. Over this, a flexible electrode 32, constructed of a resilient metallic material, for example, such as frequently used for "finger stock." This movable electrode 32 is illustrated in a flat view in FIG. 5. The movable or flexible electrode 32 is formed of the aforementioned resilient material and is prestressed, so that in the absence of restraining forces it will assume a generally conical or domelike shape with its extreme edges lying in a substantially flat plane and its center upraised generally in the manner in which it is depicted in FIG. 4. It will be noted that the backing plate 31, which is attached to the unthreaded end of shaft 35 is capable of substantially flattening out the said flexible electrode 32, as it is lowered. As the perimeter of the part 32 increases, due to downward adjustment pressure from 31, the wedge-shaped relief openings, shown in FIG. 5, tend to expand somewhat. The number of relief cuts depicted in FIG. 5 is not necessarily limiting and is arbitrarily illustrated. Many more and smaller width radial cuts could have been provided, giving the part the appearance of a large number of radially projecting close-spaced fingers on a central disc. As in the other embodiments discussed, the effect of external air pressure is such as to tend to cause the capacitor to assume its fully meshed position, the adjustment nut resisting this tendency and enforcing a predetermined setting.

It will be noted that the backing plate is illustrated in FIG. 4 as being slightly dished upwardly around its perimeter. This perimeter is contained within the inside diameter of the ceramic envelope 34, this design serving to align the shaft 35 laterally. The perimeter of the part 32 operates against the lubricatory surface of the Teflon dielectric layer, and accordingly, it will be realized that no bearing structure, as commonly encountered in prior art devices, is required in the embodiment of FIG. 4, or, for that matter, in the embodiments of FIGS. 1 through 3. In all cases, the sliding of the movable electrode, or plate, of the capacitor, is accomplished against the lubricatory surface of the Teflon dielectric layer. In the embodiments of FIGS. 1 through 3, the motion of the movable electrode is entirely axial translation; however, the deformation of part 32 in the FIG. 5 is part of the motion in that embodiment. Nevertheless, the advantage of the lubricatory Teflon surface is employed in all embodiments illustrated. This low sliding friction characteristic of the Teflon applies where it slides against the ceramic body shell members in the piston type embodiments of FIGS. 1 and 3.

The adjustment nut 38 bears against the closure endplate 37. The bellows 36, being conductively sealed to the metallic rod 35, provides an external contact for the movable plate at the said end plate 37.

The said piston type embodiments provide substantially linear capacitance variation as a function of adjustment knob rotation until the added effect of the approach of the tubular electrode closed ends becomes significant (i.e., at nearly fully meshed positions).

The embodiment of FIG. 1 has the advantage of eliminating bellows and shaft current, provided external connections are consistent with that objective. Accordingly, the device of FIG. 1 has a relatively low equivalent circuit inductance and a higher Q due to reduced current path losses (mainly due to bellows resistance).

It has been determined that Teflon can be "baked out" to a degree consistent with vacuum levels of $10^{-10}$ Torr.

A capacitor constructed in accordance with the present invention can be expected to withstand peak voltages up to 28 kilovolts and have at least a 20 kilovolt stable working rating with 20-mil Teflon dielectric. In air, this performance would be impossible as the Teflon yielded to the damaging effects of corona.

It will be apparent that features of each embodiment could be interchanged with exercise of ordinary mechanical and electrical design skills. Although ceramic body insulator sections are illustrated, glass sections could serve the same purpose. Both ceramic and glass body insulator sections have been widely used in prior art vacuum components.

Although Teflon has been cited as the preferred fluorocarbon material, other dielectric material with equivalent lubricity, dielectric strength, and low vapor pressure can, of course, be used. The significant parameters for the dielectric are:

coefficient of friction in vacuum less than 0.2, dielectric strength greater than 1,000 volts per mil, and vapor pressure less than $10^{-4}$ Torr.

Various other modifications and variations are possible within the scope of the present invention. Accordingly, it is not intended that the scope of the claims should be limited by this description or the drawings, as these are intended to be illustrative and typical only.

What is claimed is:

1. A solid dielectric vacuum capacitor comprising:

a hermetically sealed evacuated enclosure; a movable and at least one fixed capacitor electrodes each having at least one surface within said sealed enclosure;

an elongated mechanical control member connected to said movable electrode to control said movable electrode in a predetermined mode of motion which is at least partially sliding motion;

an extendable bellows sealed at one end to said enclosure and along the length of said elongated control member to permit said predetermined mode of motion of said movable electrode within said sealed enclosure;

means for providing separate external electrical connections for said fixed and movable electrodes, including electrical insulation means forming a part of said enclosure for providing electrical separation of said electrodes;

and a dielectric layer emplaced between said movable and fixed electrode, said dielectric being composed of insulating material exhibiting a lubricatory surface in vacuum, relatively high dielectric strength and vapor pressure less than $10^{-4}$ Torr.

2. The invention set forth in claim 1 in which said dielectric layer is defined as being composed of a fluorocarbon polymer having a high melting point.

3. The invention set forth in claim 1 in which said dielectric layer is composed of polytetrafluoroethylene.

4. Apparatus according to claim 2 in which said enclosure is elongated and generally tubular in shape, said electrical insulation means forming a part of said enclosure comprises a generally cylindrical shell of insulating material, said fixed capacitor electrode comprises a generally tubular metallic extension of said insulation means having a closed end, said movable electrode is a coaxial generally tubular member fitting within said fixed electrode and said dielectric layer is emplaced between the inside surface of said fixed electrode and the outside surface of said movable electrode.

5. Apparatus according to claim 4 in which said dielectric layer is fixed to the outer periphery of said movable electrode, thereby to form a lubricatory interface with said fixed electrode.

6. Apparatus according to claim 5 including two of said fixed electrodes in axial series separated by said cylindrical shell of insulating material, and in which said movable electrode is axially positionable in differential capacitance relationship with respect to said two fixed electrodes.

7. The invention set forth in claim 2 in which said fixed electrode is a substantially planar surface normal to the axial centerline of said enclosure, said movable electrode is a generally disc shape member of resilient metal predisposed to assume a generally conical shape in the absence of axially applied force, said dielectric layer is a planar sheet emplaced between said fixed and movable electrodes, and said mechanical control member is arranged to exert a force tending to flatten said movable electrode as its peripheral edges slide radially outward thereby to correspondingly control the capacitance between said electrodes.

8. The invention set forth in claim 5 in which said movable electrode is a generally tubular closed-end member and said dielectric layer substantially encases said movable electrode, whereby the fully meshed capacitance between said fixed and movable electrodes is proportional to the surface area of said movable electrode in juxtaposition with said fixed electrode, including the area of said closed end.

9. A solid dielectric variable vacuum capacitor comprising:

at least one generally tubular metallic outer member forming a first capacitor plate;

a generally tubular metallic inner member of outside diameter smaller than the inside diameter of said outer member;

a generally tubular fluorocarbon polymer dielectric member of inner and outer diameters differing from said inner member outside diameter and said outer member inside diameter, respectively, by substantially only sliding fit allowances, said inner member being axially slidably supported within said outer member by said dielectric member without additional bearing means;

a conductive mechanical control member connected for providing axial sliding movement of said inner tubular member to vary the capacitance between said inner and outer members by varying the axial insertion of said inner member within said outer member;

an evacuated enclosure including said outer member as a part thereof, said enclosure providing evacuated space at least enclosing the adjacent surfaces of said inner and outer tubular members and said dielectric member, said enclosure also including an extendable metallic bellows sealed between said mechanical member and an end of said enclosure to permit axial movement of said mechanical member within said enclosure;

and insulating means for providing an electrically insulated mounting for said mechanical control member externally adjacent the connection of said mechanical control member and said bellows, thereby to electrically isolate said inner and outer members, said inner member making external electrical connection through said bellows and said mechanical member.

10. Apparatus according to claim 9 in which said fluorocarbon polymer is polytetrafluoroethylene.

* * * * *